HAROLD LERMAN
INVENTOR.

BY S. A. Giarratana
George B. Oujevolk
ATTORNEYS

United States Patent Office 3,284,617
Patented Nov. 8, 1966

3,284,617
HYBRID STRAPDOWN INERTIAL NAVIGATION SYSTEM
Harold Lerman, Paramus, N.J., assignor to General Precision, Inc., Little Falls, N.J., a corporation of Delaware
Filed May 15, 1962, Ser. No. 194,765
9 Claims. (Cl. 235—150.25)

This invention relates to inertial navigation systems, and more particularly to inertial navigation systems which include platforms which are stable about only two axes.

There are two basic types of inertial navigation systems in the prior art, accelerometer stabilized systems and strapdown systems. The accelerometer stabilized systems contain a stable platform in which a cluster is stabilized in a known orientation about three mutually perpendicular axes. Gyros serve as error detectors to maintain the stabilization of the cluster. In general, accelerometer stabilized systems include complex stable platforms and relatively simple computers. The strapdown systems eliminate the stable platforms entirely. The gyros and accelerometers are mounted directly on the body of the vehicle carrying the system. As a result a highly complex computer is required to convert the generated signals into usable navigational information.

The system of the present invention is a hybrid of the strapdown and accelerometer stabilized systems in that it combines the principles of both. The hybrid system of the present invention makes use of a platform which has a cluster stabilized about only two axes. One axis of the platform, which is referred to as the Z axis, remains in a known orientation, and the other two axes of the platform, the heading axis and the cross heading axis, rotate about the Z axis with the vehicle as the vehicle maneuvers. Hence the heading and cross heading axis will always be in a plane of known orientation but will rotate in this plane as the vehicle maneuvers. The accelerometers of the platform thus are effectively stabilized about the heading and cross heading axes and are body mounted about the Z axis. One two degree of freedom or two single degree of freedom gyros are required as error detectors to stabilize the cluster about the heading and cross heading axes. An additional single degree of freedom gyro is included to measure the angular rate of rotation about the Z axis. The accelerometers measure the acceleration of the platform along the heading and cross heading axes. The signals from the accelerometers and the gyro measuring the angular rate about the Z axis provide the necessary information for inertial navigation. The computer required to convert these signals into the desired navigational information is not appreciably more complex than the computers in the accelerometer stabilized systems, and yet the hybrid system of the present invention uses a platform with a cluster stabilized about only two axes which is substantially less complex than the platforms in which the cluster is stabilized about three axes as required by acceleration stabilized systems. As a result, the platform of the hybrid system of the present invention has advantages of size, weight and reliability over those required by the accelerometer stabilized systems.

Accordingly, a principal object of this invention is to provide an improved inertial navigation system.

Another object of this invention is to simplify inertial navigation systems.

A further object of this invention is to simplify the platform in an inertial navigation system without appreciably increasing the complexity of the computer of the system.

A still further object of this invention is to decrease the size and weight of the platforms in inertial navigation systems without appreciably increasing the complexity of the computers in these sysems.

A still further object of this invention is to reduce the cost of inertial navigation systems.

A still further object of this invention is to increase the reliability of inertial navigation systems.

A still further object of this invention is to provide an inertial navigation system making use of a platform which stabilizes a cluster about only two axes.

Other objects and advantages of the present invention will become readily apparent as the following detailed description of the invention unfolds, and when taken in conjunction with the accompanying drawings, wherein.

Figure 1:
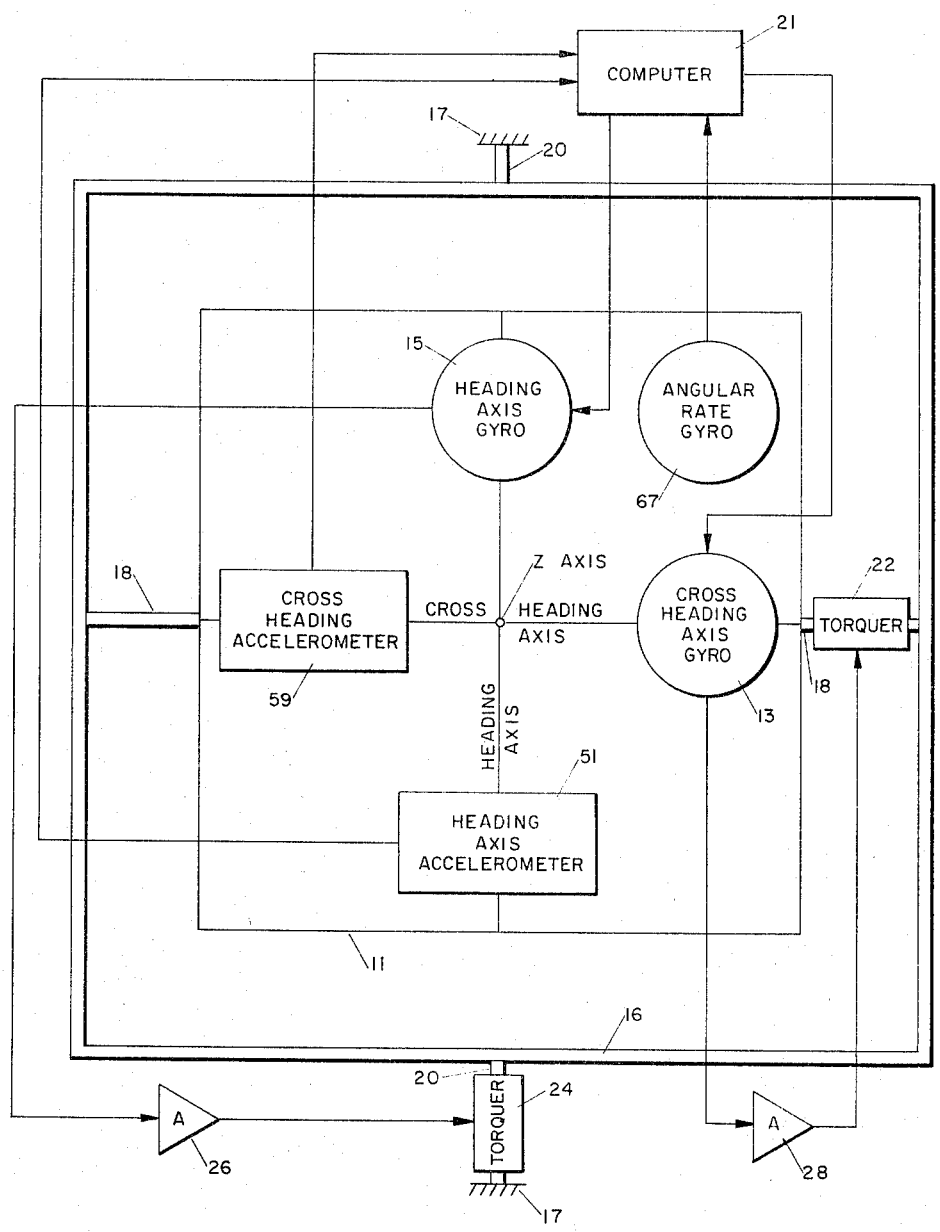
FIG. 1 illustrates an embodiment of the invention in which the Z axis of the platform is maintained aligned with vertical.

In the system schematically illustrated in FIG. 1, the cluster is designated by the reference number 11. Three mutually perpendicular axes are defined in the cluster 11. The two of the axes which are shown fully in FIG. 1 are defined as the heading axis and the cross heading axis. The third axis, which is perpendicular to the heading and cross heading axes, is defined as the Z axis. In the operation of the system the Z axis is aligned with vertical.

The cluster 11 is mounted on the frame 17 of a vehicle by means of gimbals. The cluster 11 is pivotally mounted on a gimbal frame 16 by means of a gimbal axle 18, which is aligned with the cross heading axis. The gimbal frame 16 is pivotally mounted with respect to the vehicle frame 17 by means of a gimbal axle 20 disposed perpendicular to the gimbal axle 18. A torquer 22 controls the pivoting of the cluster 11 on the axle 18 with respect to the gimbal 16. A torquer 24 controls the pivoting of the gimbal frame 16 on the axle 20 with respect to the vehicle frame 17. A heading axis gyro 15 and a cross heading axis gyro 13 are mounted on the cluster 11 to maintain the alignment of the Z axis. When the cluster 11 starts to pivot about the heading axis with respect to the gyro 15 as a result, for example, of maneuvers of the vehicle, the gyro 15 generates a signal which is amplified by an amplifier 26 and fed to the torquer 24. The torquer 24, in response to this signal, will pivot the gimbal frame 16 on the axle 20 and thus will pivot the cluster 11 about the heading axis with respect to the vehicle frame 17. The torquer 24 pivots the gimbal frame 16 in a direction to eliminate the output signal of the heading axis gyro 15. In this manner the cluster 11 is maintained unpivoted about the heading axis with respect to the heading axis gyro as the vehicle maneuvers. When the cluster 11 starts to pivot about the cross heading axis with respect to the cross heading axis gyro 13 as a result, for example, of the maneuvering of the vehicle, the gyro 13 generates a signal which is amplified by an amplifier 28 and fed to the torquer 22, which in response thereto will pivot the cluster 11 on the axle 18 about the cross heading axis with respect to the gimbal frame 16 in a direction to eliminate the output signal from the cross heading gyro 13 so that the cluster 11 is maintained unpivoted about the cross heading axis with respect to the gyro 13. In this manner the Z axis is maintained aligned with the gyros 13 and 15. The gimbal frame 16, the gimbal axles 18 and 20, and the torquers 22 and 24 constitute a gimbal control system which locks the cluster 11 about the Z axis with respect to the vehicle frame so that the heading and cross heading axes will not pivot about the Z axis with respect to the vehicle frame but will turn with the vehicle frame when the vehicle frame pivots about the Z axis as the vehicle maneuvers. In this manner the cluster 11 is stabilized about the cross heading axis and the heading axis but is unstabilized about the Z axis. A cross heading accelerometer 59 is mounted on the cluster 11 to measure the acceleration of the cluster 11 along the cross heading axis. The cross heading accelerometer 59 produces a signal representing this acceleration and feeds this signal to a computer 21. A heading accelerometer 51 is mounted on the cluster 11 to measure the acceleration of the cluster 11 along the heading axis and produces an output signal representing this acceleration. The output signal of the heading accelerometer 51 is also fed to the computer 21. An angular rate gyro 67 is mounted on the cluster 11 to measure the rate at which the cluster 11 pivots about the Z axis and produces an output signal representing this rate. The output signal of the angular rate gyro 67 is also fed to the computer 21. The computer 21, in response to the signals received from the cross heading accelerometer 59, the heading accelerometer 51 and the angular rate gyro 67, performs mathematical operations on these signals to provide the desired navigational data. The Z axis is maintained aligned with vertical by Schuler tuning. Accordingly, the computer 21 feeds signals back to the heading axis gyro and the cross heading axis gyro to cause these gyros to pivot about the heading and cross heading axes at rates to maintain the Z axis aligned with vertical in accordance with the principles of Schuler tuning.

Figure 2:
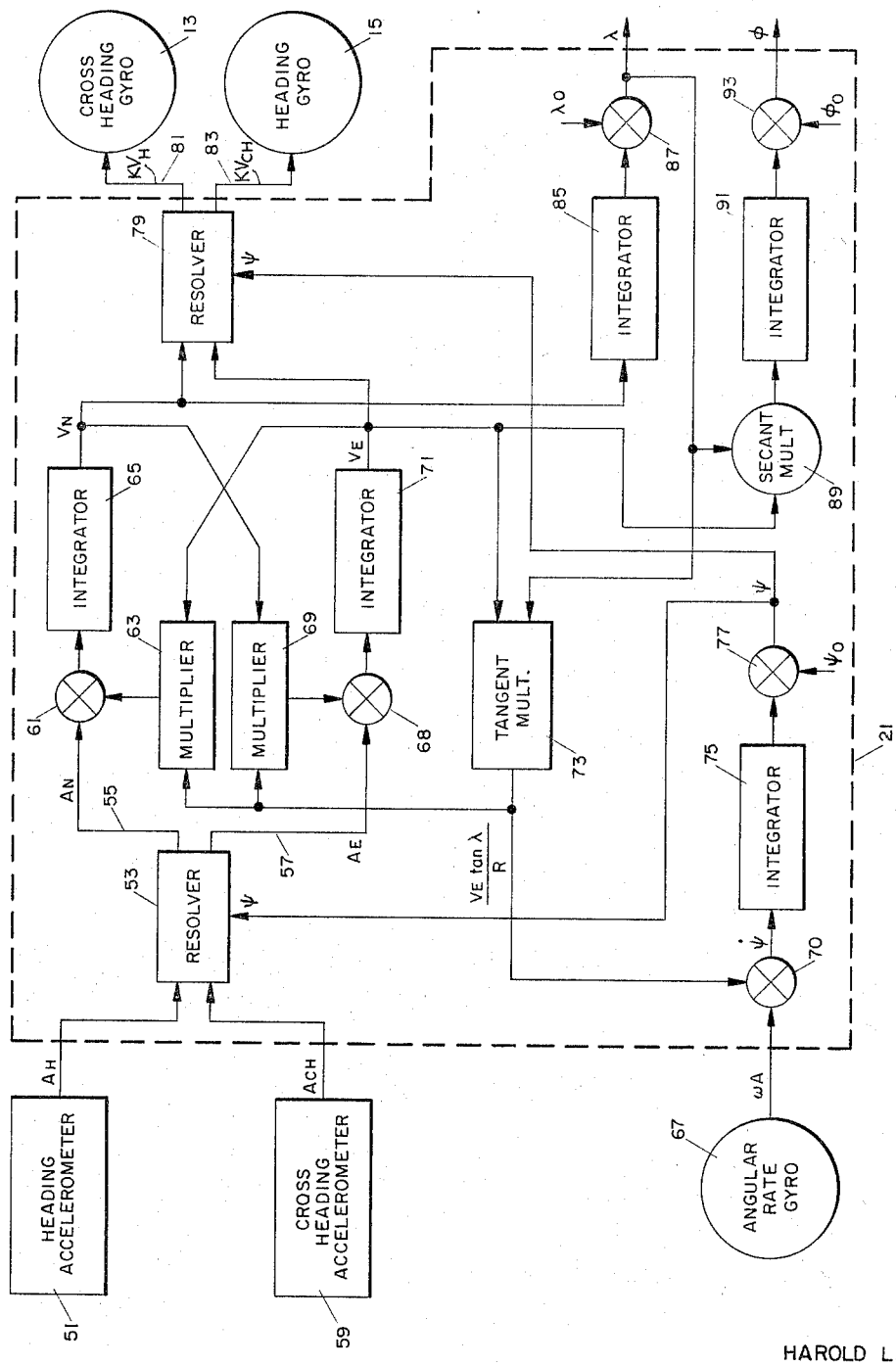
FIG. 2 illustrates a block diagram of a computer for the system of FIG. 1.

The block diagram shown in FIG. 2 illustrates a computer that can be used for the computer 21 of the system shown in FIG. 1. In order to facilitate the description and understanding of the system, the block diagram of FIG. 2 has not included the circuitry for correcting the alignment of the system for the earth's rate of rotation. As shown in FIG. 1, the output signals of the accelerometers 51 and 59 are fed in the computer 21 to a resolver 53, to which a signal representing the heading angle $\psi$ is also fed. In this system the heading angle $\psi$ is defined as the angle between the heading axis and north. The resolver 53, in response to the applied signals, produces an output signal on a channel 55 representing $$A_H \cos \psi - A_{CH} \sin \psi$$

in which $A_H$ is the acceleration along the heading axis represented by the output signal of the heading accelerometer 51 and $A_{CH}$ is the acceleration along the cross heading axis represented by the output signal of the cross heading accelerometer 59. The output signal on channel 55 therefore represents the component of acceleration directed north, which component is designated $A_N$. The resolver 55 also produces in response to the applied signals an output signal on channel 57 representing $$A_H \sin \psi + A_{CH} \cos \psi$$

Thus the signal produced on channel 57 represents the component of acceleration directed east, the component being designated $A_E$. Accelerations $A_N$ and $A_E$ can be represented by the following expressions:

$$A_N = \dot{V}_N + (V_E^2/R) \tan \lambda$$

$A_E = \dot{V}_E - (V_N V_E/R) \tan \lambda$ in which $\dot{V}_N$ is the differential of the velocity in the north direction, $V_N$ is the velocity in the north direction, $\dot{V}_E$ is the differential of the velocity in the east direction, $V_E$ is the velocity in the east direction, R is the radius of the earth's curvature, and $\lambda$ is the latitude. The output signal representing $A_N$ on channel 55 is fed to an adding means 61 where this signal is combined with the output signal of a multiplier circuit 63. The multiplier circuit 63 receives signals representing $(V_E \tan \lambda)/R$ and $V_E$ applied to its inputs so that it applies a signal to the adding means 61 representing $(V_E^2 \tan \lambda)/R$. The polarity of the signal applied to the adding means 61 by the multiplier 63 is such that the output signal of the multiplier 63 is subtracted from the signal on channel 55 in the adding means 61. As a result, the output signal of the adding means 61 will represent $\dot{V}_N$. This signal is integrated by an integrator 65 to produce a signal representing $V_N$, the velocity in the north direction. The output signal on channel 57 representing $A_E$ is fed to an adding means 68 which also receives an output signal from a multiplier 69. The multiplier 69 receives input signals representing $(V_E \tan \lambda)/R$ and $V_N$ so that the multiplier 69 produces an output signal representing $(V_N V_E \tan \lambda)/R$. The polarity of the output signal of the multiplier 69 is such that its output signal is added to the signal on channel 57 in the adding means 68. As a result the adding means 68 will produce an output signal representing $\dot{V}_E$. The output signal of the adding means 68 is integrated by an integrator 71 to produce an output signal representing $V_E$, the velocity in the east direction. The output signal of the integrator 65 is fed to one of the inputs of the multiplier 69 to provide the input signal thereto representing $V_N$ and the output signal of the integrator 71 is fed to one of the inputs of the multiplier 63 to provide a signal thereto representing $V_E$. The output from the integrator 71 is also fed to a tangent multiplier 73 which also receives a signal representing the latitude $\lambda$. The tangent multiplier 73, in response to the applied signals, produces an output signal representing $V_E \tan \lambda$ divided by the constant R. This signal is fed to the multipliers 63 and 69. The output signal of the angular rate gyro 67 representing the angular rate at which the cluster 11 is rotating about the Z axis is fed to an adding means 70. This angular rate is designated $\omega_a$. The rate $\omega_a$ can be represented by the expression $\omega_a = \dot{\psi} - (V_E/R) \tan \lambda$ in which $\dot{\psi}$ is the rate of change of the angle $\psi$. The output signal of the tangent multiplier 73 is also fed to the adding means 70. The polarity of the signal fed to the adding means 70 from the tangent multiplier 73 is such that the output signal of the tangent multiplier 73 will be added to the output signal of the angular rate gyro 67 in the adding means 70 so that the output signal of the adding means 70 represents $\dot{\psi}$. This output signal of the adding means 70 is integrated by an integrator 75 to produce a signal representing the total angle through which the heading axis has changed during the maneuvering of the vehicle. This output signal is added to a signal representing the initial heading angle $\psi_0$ at the start of the operation of the system in an adding means 77. Thus the output signal of the adding means 77 will continuously represent the present heading angle $\psi$. This output signal of the adding means 77 is fed to the resolver 53 to provide thereto the required signal representing the heading angle $\psi$. The output signal of the adding means 77 representing $\psi$ is also fed to a resolver 79, which also receives the output signals from the integrators 65 and 71 representing $V_N$ and $V_E$. In response to the applied signals the resolver 79 produces an output signal on a channel 81 proportional to the quantity $V_N \cos \psi + V_E \sin \psi$ and an output signal on a channel 83 proportional to the quantity $$V_E \cos \psi - V_N \sin \psi$$

Thus the output signal on channel 81 will be proportional to the velocity along the heading axis, which is designated $V_H$, and the output signal on channel 83 is proportional to the velocity along the cross heading axis, which is designated $V_{CH}$. Thus the signals produced on channels 81 and 83 can be represented by $KV_H$ and $KV_{CH}$ in which K is a constant determined by the resolver 79. The signal proportional to $V_H$ on channel 81 is fed to the cross heading gyro 13 and the signal representing $V_{CH}$ on channel 83 is fed to the heading gyro 15. The cross heading axis gyro 13 will pivot about the cross heading axis at a rate proportional to the signal applied from channel 81 and the heading axis gyro 15 will pivot about the heading axis at a rate proportional to the signal applied from channel 83. The value K is selected to equal $1/R$ to Schuler tune the system so that the heading axis gyro 15 and the cross heading axis gyro 13 pivot fast enough to keep the Z axis aligned with vertical as the vehicle moves over the earth's curved surface. The output signal of the integrator 65 is also fed to an integrator 85, which in response thereto produces an output signal representing the total change in latitude. This output signal is combined with a signal representing the initial latitude $\lambda_0$ in an adding means 87 to produce an output signal continuously representing the present latitude $\lambda$. This signal is fed to the tangent multiplier 73 to provide thereto an input signal representing $\lambda$. The output signal of the adding means 87 representing $\lambda$ is also applied to a secant multiplier 89, to which the output signal of the integrator 71 representing $V_E$ is fed. The output of the secant multiplier 89 represents $V_E$ times the secant of $\lambda$, which is proportional to $\dot{\phi}$, the rate of change of longitude. This signal is integrated by an integrator 91 to produce an output signal representing the total change in longitude. The output signal of the integrator 91 is combined in an adding means 93 with a signal representing the initial longitude $\phi_0$ to produce an output signal continuously representing the present longitude $\phi$.

In this manner, the circuit shown in FIGURE 2 provides the computed functions to Schuler tune the system of FIGURE 1 and also continuously provides the desired navigational data of the present latitude and longitude. The corrections for the earth's rate of rotation can be provided in the system in the same manner as in prior art systems.

Figure 3:
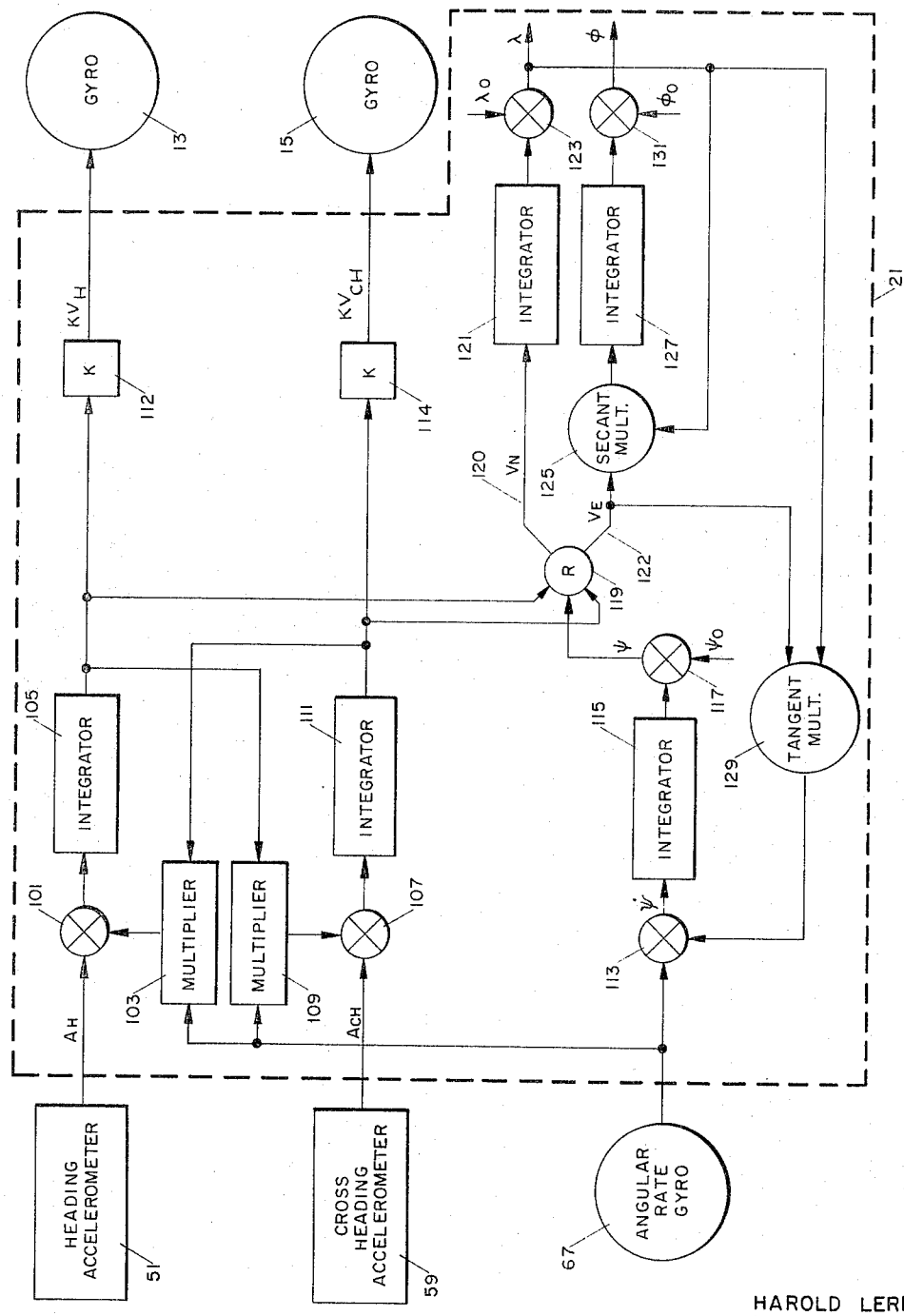
FIG. 3 is a block diagram of another computer for the system of FIG. 1.

Sometimes it is undesirable to resolve the signals representing acceleration directly as done in the computer of FIG. 2. In such instances, it may be desirable to use a circuit such as that shown in FIG. 3 for the computer 21. In the circuit shown in FIG. 3 the earth's rate corrections have again been omitted to facilitate the understanding and description of the system. In the computer of FIG. 3, the output signal of the heading accelerometer 51 representing $A_H$ is fed to an adding means 101. The output signal of the heading accelerometer can be expressed as $A_H = \dot{V}_H + \dot{\psi} V_{CH} - (V_{CH} V_E / R) \tan \lambda$. A multiplier 103 also applies a signal to the adding means 101. The multiplier 103 receives a signal directly from the angular rate gyro 67 representing $\omega_a$ and a signal representing $V_{CH}$ and applies a signal representing the product of these two signals to the adding means 101. As pointed out above, the output signal of the angular rate gyro can be expressed as $\omega_a = \dot{\psi} - (V_E/R) \tan \lambda$. Therefore the product represented by the output signal of the multiplier 103 will represent $\dot{\psi} V_{CH} - (V_{CH} V_E / R) \tan \lambda$. The polarity of the output signal of the multiplier 103 is such that the output signal of the multiplier 103 is subtracted from the output signal of the heading accelerometer 51 in the adding means 101 so that the adding means 101 produces an output signal representing $\dot{V}_H$, the rate of change of the heading velocity. This output signal of the adding means is integrated by an integrator 105 to produce a signal representing $V_H$. The output signal of the cross heading accelerometer 59 is applied to an adding means 107, which also receives a signal from a multiplier 109. The output signal of the cross heading accelerometer 59 representing $A_{CH}$ can be represented as $\dot{V}_{CH} - \dot{\psi} V_H + (V_H V_E / R)$ tan $\lambda$. The multiplier 109 receives the output signal from the angular rate gyro representing $\omega_a$ or $\dot{\psi} - (V_E/R) \tan \lambda$ and multiplies this signal times a signal representing $V_H$, which it receives from the output of the integrator 105. The multiplier 109 applies a signal representing the product of these two applied signals to the adding means 107. Thus the output signal of the multiplier 109 represents $V_H \dot{\psi} - (V_H V_E/R) \tan \lambda$. The polarity of the output signal of the multiplier 109 is such that the output signal of the multiplier 109 is added to the output signal of the accelerometer 59 in the adding means 107 so that the output signal of the adding means 107 will represent $\dot{V}_{CH}$. This output signal of the adding means 107 is integrated by an integrator 111, which produces an output signal representing $V_{CH}$. The output signals of the integrators 105 and 111 representing $V_H$ and $V_{CH}$ are multiplied times the factor K in scaling means 112 and 114 respectively and applied to the gyros 13 and 15. In response to the signals applied from the scaling means 112 and 114, the gyros 13 and 15 pivot about the cross heading and heading axes respectively at rates proportional to the applied signals. As in the computer of FIG. 2, the factors K are selected to equal $1/R$ to provide Schuler tuning so that the Z axis is maintained aligned with vertical. The output signal from the angular rate gyro representing $\omega_a$ or $\dot{\psi} - (V_E/R) \tan \lambda$ is added to a signal representing $(V_E/R) \tan \lambda$ in an adding means 113, which accordingly produces an output signal representing $\dot{\psi}$. This output signal of the adding means 115 is integrated by an integrator 117 to produce an output signal representing the total change of $\psi$, the heading angle. The output signal of the integrator 115 is combined with a signal representing the initial heading angle $\psi_0$ in an adding means 117 so that the adding means 117 continuously produces an output signal representing the present heading angle $\psi$. This output signal is fed to an input of a resolver 119, which also receives the output signals from the integrators 105 and 111 representing $V_H$ and $V_{CH}$. In response to the applied signals the resolver 119 produces an output signal on a channel 120 representing $V_H \cos \psi - V_{CH} \sin \psi$ and a signal on a channel 122 representing $V_H \sin \psi + V_{CH} \cos \psi$. Thus the output signal produced on channel 120 represents $V_N$, the velocity in the north direction, and the signal on channel 122 represents $V_E$, the velocity in the east direction. Since the velocity in the north direction is proportional to the rate of change of latitude, the integration of the signal representing $V_N$ will produce an output signal that can be used to represent the total change in latitude. This integration is carried out by an integrator 121. The output signal of the integrator 121 is added to a signal representing the initial latitude $\lambda_0$ in an adding means 123 to produce an output signal continuously representing the present latitude $\lambda$. The output signal of the adding means 123 representing $\lambda$ is fed to a tangent multiplier 129 which also receives the signal on channel 122 representing $V_E$. In response to the applied signals the tangent multiplier 129 produces an output signal representing $(V_E \tan \lambda)/R$ which is the signal which is added to the output signal of the angular rate gyro 67 in the adding means 113. The output signal of the adding means 123 representing $\lambda$ is also applied to a secant multiplier 125 to which the output signal of the resolver 119 representing $V_E$ is also applied. In response to the applied input signals the secant multiplier 125 produces an output signal representing $V_E$ times the secant of $\lambda$. This signal will be proportional to the rate of change of the longitude $\phi$ and is integrated by an integrator 127 to produce an output signal representing the total change in longitude. The output signal of the integrator 127 is added to a signal representing the initial longitude $\phi_0$ in an adding means 131 to produce an output signal representing the longitude $\phi$. Thus the circuit shown in FIG. 3 provides the necessary signals to be applied to the gyros 13 and 15 to provide Schuler tuning and also continuously provides the desired navigational information, the present latitude and the present longitude.

Figure 4:
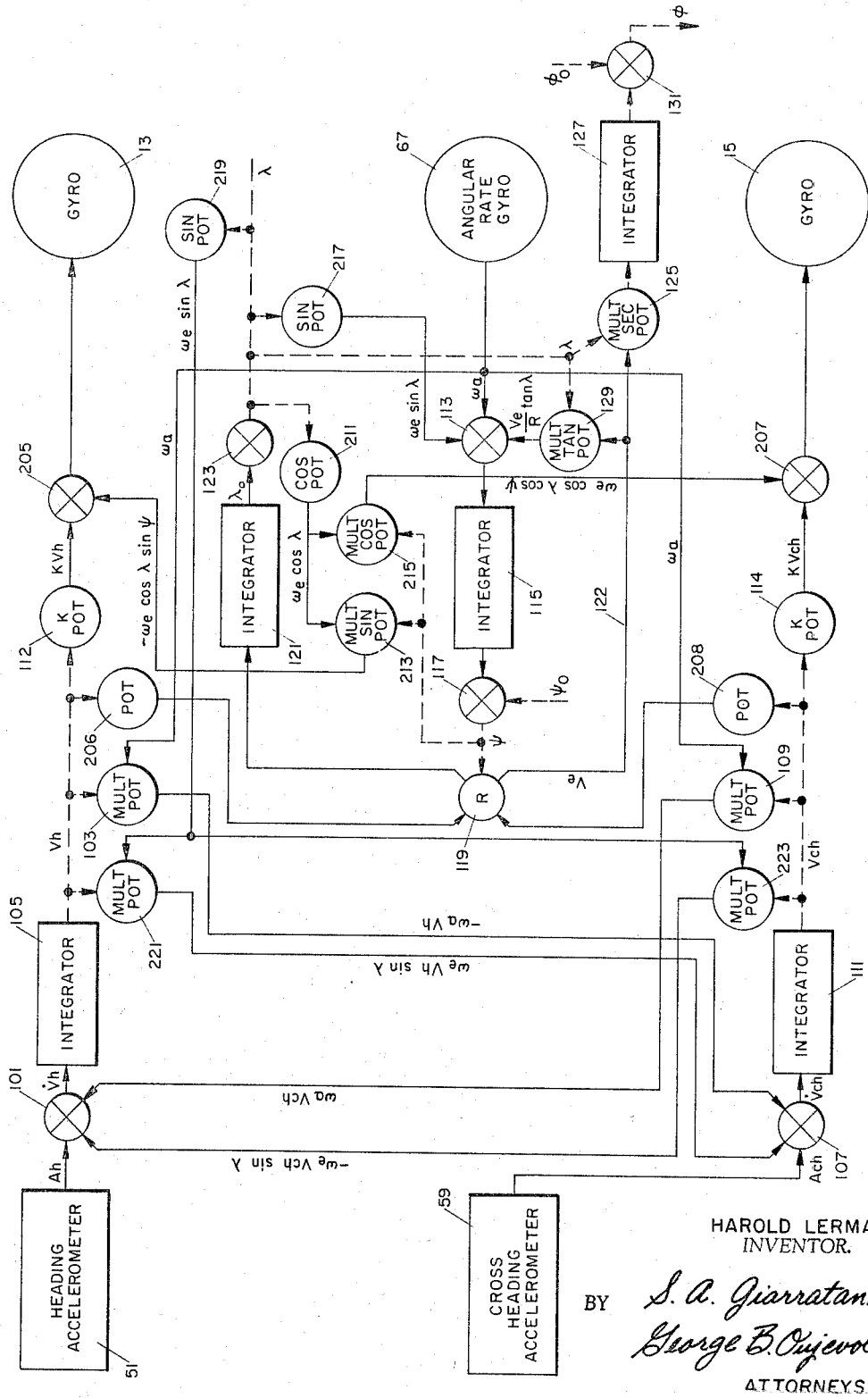
FIG. 4 is a block diagram showing the computer of FIG. 3 in more detail.

FIG. 4 is a schematic block diagram illustrating the computer of FIG. 3 in more detail showing the circuitry and hardware added to provide the corrections for the earth's rate of rotation. As shown in FIG. 4, all of the integrators 105, 111, 115, 121 and 127 are each of the type that receive electrical signals and produce mechanical output signals in the form of the angular position of an output shaft. Each of these integrators positions its output shaft at an angular position displaced from a reference angular position through an angle proportional to the integral of the applied input signal. Thus the angular position of the output shaft of the integrator 105 represents $V_H$ and the angular position of the output shaft of the integrator 111 represents $V_{CH}$. The multipliers 103 and 109 each comprise potentiometers adapted to receive one mechanical signal and one electrical signal. The mechanical input signal displaces the movable contact of the potentiometer along the resistance of the potentiometer by an amount proportional to the signal. The electrical signal is applied across the resistance of the potentiometer. The resulting electrical signal produced at the movable contact will be proportional to the product of the input mechanical and electrical signals and therefore can properly represent this product. As shown in FIGURE 4, the output shafts of the integrators 105 and 111 drive the movable contacts of the potentiometers comprising the multipliers 103 and 109 to provide the mechanical input signals thereto representing $V_H$ and $V_{CH}$ respectively. The electrical output signal of the angular rate gyro 67 is applied across the resistances of the potentiometers comprising the multipliers 103 and 109 so that these multipliers produce output signals representing $\omega_a V_H$ and $\omega_a V_{CH}$ respectively. Other potentiometers are connected as multipliers in the circuit of FIGURE 4 in the same manner as the multipliers 103 and 109. These additional potentiometers are used in the generation of the correction signals for the earth's rate of rotation, as will be described below. The scaling means 112 and 114 comprise potentiometers which convert the mechanical output signals of the integrators 105 and 111 into electrical signals representing $KV_H$ and $KV_{CH}$, respectively, to be applied to the gyros 13 and 15, respectively, for Schuler tuning. The output signals of the scaling means 112 and 114 are applied to the gyros 13 and 15 through adding means 205 and 207, respectively, so that correction signals may be added to the output signals of the scaling means 112 and 114 to correct the alignment of the gyros 13 and 15 for the earth's rate of rotation. A potentiometer 206 is provided to convert the mechanical output signal of the integrator 105 into an electrical signal representing $V_H$ which electrical signal is applied to the resolver 119. A potentiometer 208 is used to convert the mechanical output signal of the integrator 111 into an electrical signal representing $V_{CH}$, which electrical signal is also applied to the resolver 119. The adding means 101, 107, 113, 205 and 207 are electrical analog summing circuits and each in response to received applied electrical signals produces an output signal representing the algebraic sum of the applied input signals. The adding means 117, 123 and 131 are actually mechanical differentials each having two input shafts and one output shaft. Each differential will position an output shaft at an angular position displaced from a reference point through an angle equal to the sum of the angular displacement of the input shafts from respective reference points. Thus each of the adding means 117, 123 and 131 are adapted to receive mechanical input signals and produce mechanical output signals. The tangent multiplier 129 comprises a potentiometer which is adapted to have its movable contact displaced an amount proportional to the angle represented by an applied mechanical input signal. The resistance of the potentiometer is distributed in such a way that when a voltage is applied across the resistance, the voltage produced at the movable contact will be proportional to the tangent of the angle represented by the applied mechanical input signal. Such a potentiometer is referred to as a tangent potentiometer. The system of the invention also makes use of secant potentiometers, sine potentiometers and cosine potentiometers, which operate in the same manner as the tangent potentiometer except that their resistances are distributed in such a way as to produce output signals proportional to the secant, sine and cosine, respectively, of the angles represented by the applied mechanical input signals. A mechanical input signal representing λ is fed to the potentiometer comprising the tangent multiplier 129 by driving the movable contact of the potentiometer with the output shaft of the differential comprising the adding means 123. The output signal of the resolver 119 on channel 122 representing $V_E$ is applied across the resistance of the potentiometer comprising the tangent multiplier 129. As a result the output signal produced on the movable contact of the tangent multiplier 129 will be proportional to $V_E$ tan λ and can properly represent ($V_E/R$) tan λ. The secant multiplier 125 comprises a secant potentiometer which potentiometer produces an output signal proportional to the secant of the angle represented by an applied mechanical input signal. The mechanical output signal from the adding means 123 representing λ is fed to the potentiometer comprising the secant multiplier 125 by driving the movable contact thereof with the output shaft of the differential comprising the adding means 123. The electrical signal on channel 122 representing $V_E$ is applied across the resistance of the potentiometer comprising the secant multiplier so that the output signal of the secant multiplier will be proportional to $\dot{\phi}$. The mechanical output signal of the adding means 123 representing λ is applied to the mechanical input of a cosine potentiometer 211, which produces an output signal proportional to the cosine of the angle represented by the applied mechanical signal. The output signal of the potentiometer 211 represents $\omega_e \cos \lambda$. This output signal is applied across the resistances of a sine potentiometer 213 and a cosine potentiometer 215. The mechanical output signal of the adding means 117 representing ψ is applied to the mechanical inputs of the potentiometers 213 and 215. The sine potentiometer 213 therefore produces an output signal proportional to $\omega_e \cos \lambda \sin \psi$ and the potentiometer 215 produces an output signal proportional to $\omega_e \cos \lambda \cos \psi$. The output signal of the sine potentiometer 213 is combined with the output signal of the scaling means 112 in the adding means 205 with a polarity to be subtracted therefrom. The output signal of the potentiometer 213 thus combined with the output signal of the scaling means 112 provides the correction of the alignment of the gyro 13 for the earth's rate of rotation. The output signal of the potentiometer 215 proportional to $\omega_e \cos \lambda \cos \psi$ is combined with the output signal of the scaling means 114 in the adding means 207 with a polarity to be added thereto. The output signal of the potentiometer 215 thus provides the earth's rate correction for the gyro 15.

When the earth's rate of rotation is taken into consideration, the output signal of the angular rate gyro 67 can be expressed as $\omega_a = \dot{\psi} - (V_E/R) \tan \lambda - \omega_e \sin \lambda$. The mechanical output signal of the adding means 123 representing the present latitude λ is applied to a sine potentiometer 217, which produces an output signal representing $\omega_e \sin \lambda$. This output signal is combined with the output signals of the angular rate gyro 67 and the tangent multiplier 129 in the adding means 113 with a polarity to be added to the output signal of the angular rate gyro 67 so that the portion of the output signal of the angular rate gyro 67 caused by the earth's rate is cancelled out and the output signal of the adding means 113 represents $\dot\psi$.

When the earth's rate of rotation is taken into consideration the output signal of the heading accelerometer 51 is represented by the expression $$A_H = \dot V_H - V_{CH}[\dot\psi - (V_E/R)\tan\lambda - 2\omega_e \sin\lambda]$$

and the output of the cross heading accelerometer 59 is represented by the expression $$A_{CH} = \dot V_{CH} + V_H[\dot\psi - (V_E/R)\tan\lambda - 2\omega_e \sin\lambda]$$

Since $\omega_a = \dot\psi - (V_E/R)\tan\lambda - \omega_e \sin\lambda$ the expressions for $A_H$ and $A_{CH}$ can be rewritten as follows:

$$A_H = \dot V_H - \omega_a V_{CH} + V_{CH}\omega_e \sin\lambda$$

and $$A_{CH} = \dot V_{CH} + \omega_a V_H - V_H \omega_e \sin\lambda$$

Therefore in order to make the output signals of the adding means 101 and 107 equal $\dot V_H$ and $\dot V_{CH}$, respectively, signals representing $V_{CH}\omega_e \sin\lambda$ and $V_H \omega_e \sin\lambda$ must be combined with the output signals of the heading and cross heading accelerometers 51 and 59 in the adding means 101 and 107, respectively, to cancel out the corresponding portions in the output signals of the accelerometers 51 and 59. Accordingly, the mechanical output signal of the adding means 123 is applied to a sine potentiometer 219, which in response thereto produces an output signal representing $\omega_e \sin\lambda$. This output signal is applied to potentiometers 221 and 223, connected to multiply this signal times the mechanical output signals of the integrators 105 and 111, respectively. As a result the potentiometer 221 will produce an output signal representing $V_H \omega_e \sin\lambda$ and the potentiometer 223 will produce an output signal representing $\omega_e V_{CH} \sin\lambda$. The output signal of the potentiometer 221 is combined with the output signal of the cross heading accelerometer in the adding means 107 with a polarity to be added thereto in order to cancel out the portion of this signal representing $V_H \omega_e \sin\lambda$. The output signal of the potentiometer 223 is combined with the output signal of the heading accelerometer 51 in the adding means 101 with a polarity to be subtracted therefrom in order to cancel out the portion of this signal representing $V_{CH}\omega_e \sin\lambda$.

Figure 5:
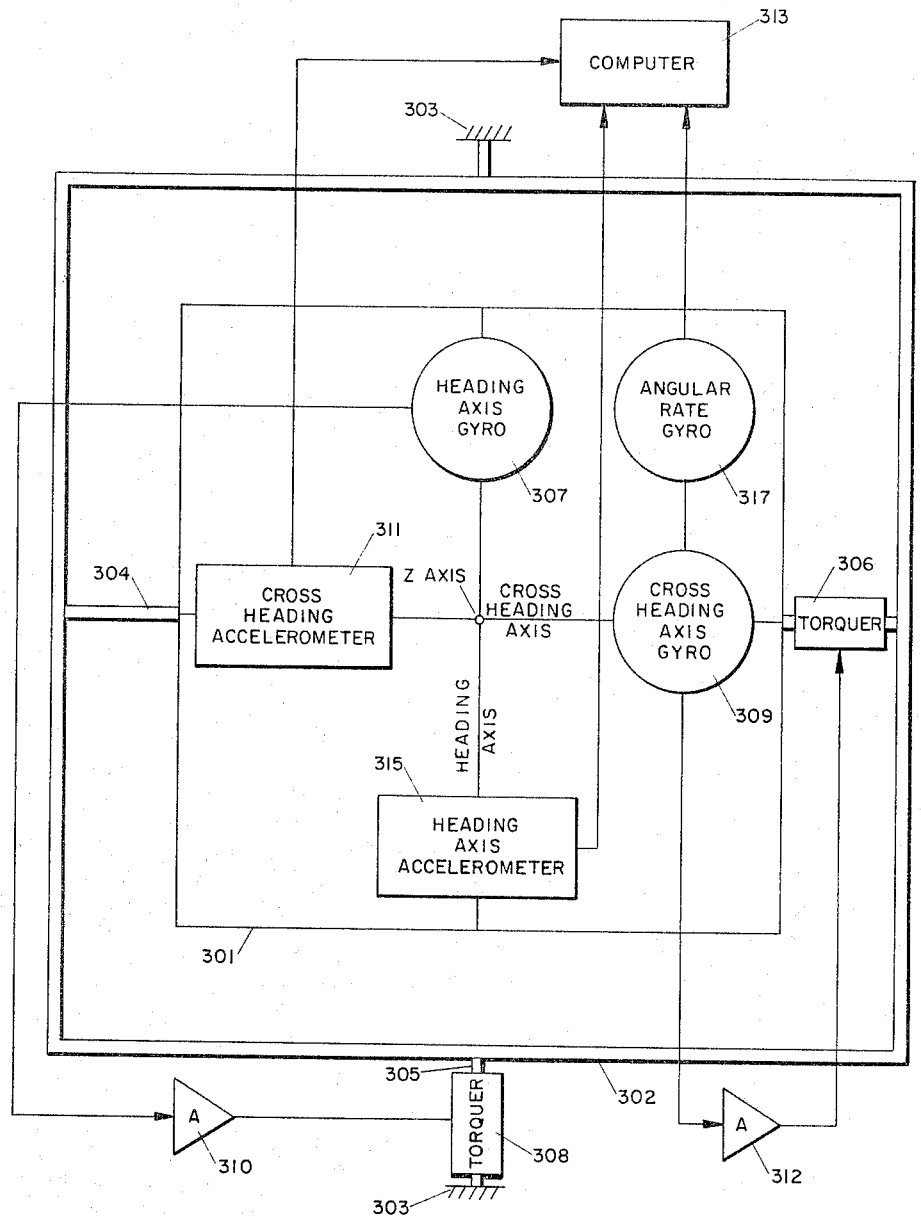
FIG. 5 illustrates another embodiment of the invention in which the Z axis is initially aligned with vertical and then maintained in a fixed orientation with respect to inertial space.

The system schematically illustrated in FIG. 5 is one in which the cluster is initially aligned with vertical but it is not maintained aligned with vertical. This system will yield reasonably accurate navigational information over relatively small areas of the earth's surface. As shown in FIG. 5, three mutually perpendicular axes are defined in a cluster 301. The two of the axes which are shown fully in FIG. 5 are defined as the heading axis and the cross heading axis. The third axis, which is perpendicular to the heading and cross heading axes, is defined as the Z axis. In the operation of the system, the Z axis is initially aligned with vertical.

The cluster 301 is mounted on the frame 303 of a vehicle by means of gimbals. The cluster 301 is pivotally mounted with respect to a gimbal frame 302 by means of a gimbal axle 304, which is aligned with the cross heading axis. The gimbal frame 302 is pivotally mounted with respect to the vehicle frame 303 by means of a gimbal axle 305 disposed perpendicular to the gimbal axle 304. A torquer 306 controls the pivoting of the cluster 301 on the axle 304 with respect to the gimbal frame 302. A torquer 308 controls the pivoting of the gimbal frame 302 on the axle 305 with respect to the vehicle frame 303. A heading axis gyro 307 and a cross heading axis gyro 309 are mounted on the cluster 301 to maintain the alignment of the Z axis. When the cluster 301 starts to pivot about the heading axis with respect to the gyro 307 as a result, for example, of maneuvers of the vehicle, the gyro 307 generates a signal which is amplified by an amplifier 310 and fed to the torquer 308. The torquer 308, in response to this signal, will pivot the gimbal frame 302 on the axle 305 and thus will pivot the cluster 301 about the heading axis with respect to the vehicle frame 303. The torquer 308 pivots the gimbal frame 302 in a direction to eliminate the output signal of the heading axis gyro 307. In this manner the cluster 301 is maintained unpivoted about the heading axis with respect to the heading axis gyro as the vehicle maneuvers. When the cluster 301 starts to pivot about the cross heading axis with respect to the cross heading axis gyro 309 as a result, for example, of the maneuvering of the vehicle, the gyro 309 generates a signal which is amplified by an amplifier 312 and fed to the torquer 306, which in response thereto will pivot the cluster 301 on the axle 304 about the cross heading axis with respect to the gimbal frame 302 in a direction to eliminate the output signal from the cross heading axis gyro 309. In this manner the Z axis is maintained aligned with the gyros 307 and 309. The gimbal frame 302, the gimbal axles 304 and 305 and the torquers 306 and 308 constitute a control system which locks the cluster about the Z axis with respect to the vehicle frame so that the heading and cross heading axes will not pivot about the Z axis with respect to the vehicle frame, but will turn with the vehicle frame when the vehicle frame pivots about the Z axis as the vehicle maneuvers. In this manner the cluster 301 is stabilized about the cross heading axis and the heading axis, but is unstabilized about the Z axis. A cross heading accelerometer 311 is mounted on the cluster 301 to measure the acceleration of the cluster 301 along the cross heading axis. The cross heading accelerometer 311 produces a signal representing this acceleration and feeds this signal to a computer 313. A heading accelerometer 315 is mounted on the cluster 301 to measure the acceleration of the cluster 301 along the heading axis and produce an output signal representing this acceleration. The output signal of the heading accelerometer 315 is also fed to the computer 313. An angular rate gyro 317 is mounted on the cluster 301 to measure the rate at which the cluster 301 pivots about the Z axis and produces an output signal representing this rate. The output signal of the angular rate gyro 317 is also fed to the computer 313. The computer 313, in response to the signals received from the cross heading accelerometer 311, the heading accelerometer 315 and the angular rate gyro 317, performs mathematical operations on these signals to provide the desired navigational data. The computer 313 does not feed signals back to the heading axis gyro and the cross heading axis gyro as in the system of FIG. 1, as the Z axis of the system of FIG. 5 is not maintained aligned with vertical.

Figure 6:
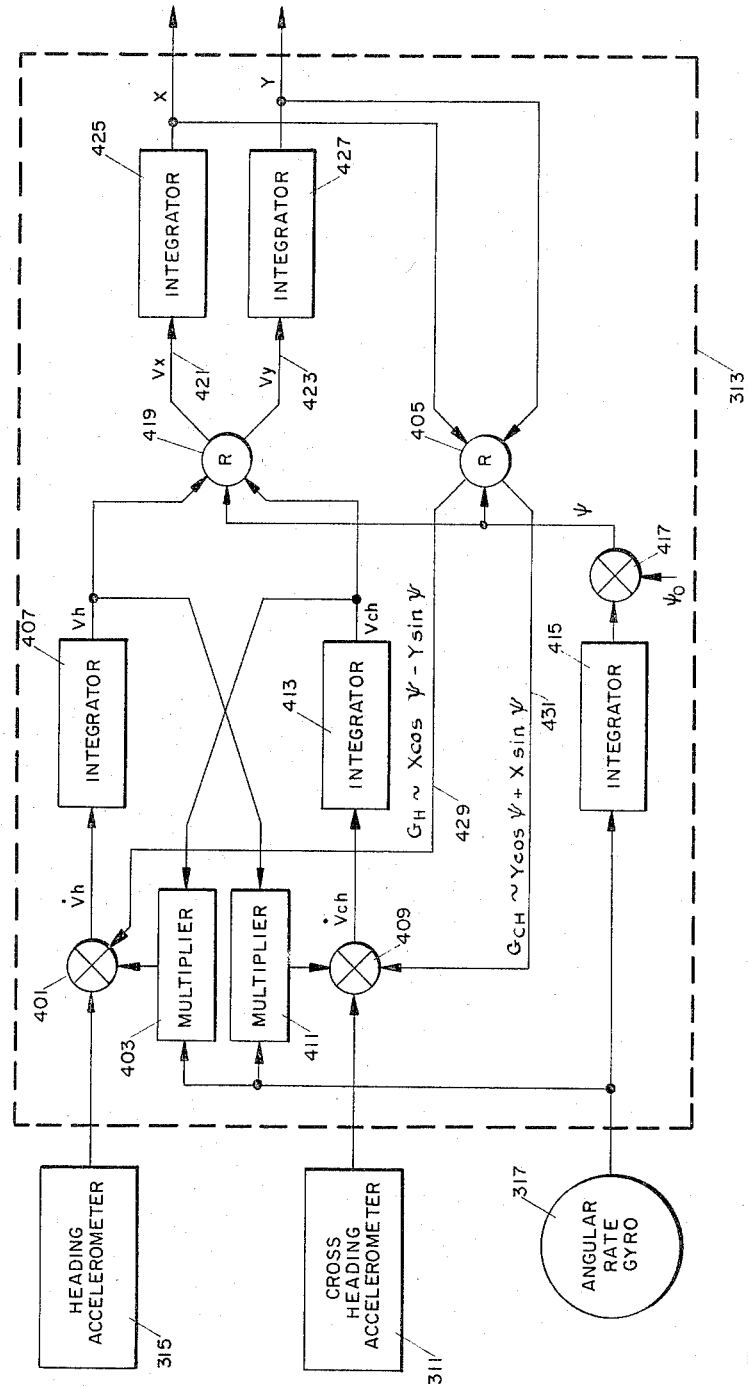
FIG. 6 is a block diagram of the computer for the system of FIG. 5.

FIG. 6 is a block diagram illustrating the computer 313. The output signal of the heading accelerometer 315 may be represented as $A_H = \dot V_H + \dot\psi V_{CH} - G_H$ and the output of the cross heading accelerometer 311 may be represented as $A_{CH} = \dot V_{CH} - \dot\psi V_H - G_{CH}$. The output signal of the angular rate gyro 317 may represented as $\omega_a = \dot\psi$. The components $G_H$ and $G_{CH}$ in the output signals of the heading accelerometer 315 and the cross heading accelerometer 311 represent components of gravity which will be sensed by the accelerometers 311 and 315 when the vehicle moves away from its point of origin and the Z axis is no longer aligned with vertical. The output signal from the heading accelerometer 315 is applied to an adding means 401 in the computer 313. The adding means 401 also receives a signal from a multiplier 403 representing the quantity $\dot\psi$ times $V_{CH}$. The adding means 401 also receives a signal from a resolver 405 representing the gravity component $G_H$ sensed by the heading accelerometer 315. The polarity of the signal fed to the adding means 401 from the multiplier 403 is such that it is subtracted from the output signal of the heading accelerometer 315 in the adding means 401 and the polarity of the output signal from the resolver 405 representing $G_H$ is such that it is added to the output signal of the accelerometer 315 in the adding means 401, so that the output signal of the adding means 401 represents $\dot{V}_H$. The output signal of the adding means 401 is integrated by an integrator 407 to produce a signal representing $V_H$. The output signal of the cross heading accelerometer 311 is fed to an adding means 409 in the computer 313. The adding means 409 also receives a signal from a multiplier 411 representing $\dot{\psi} V_H$ and a signal from the resolver 405 representing $G_{CH}$. The polarity of the signals fed to the adding means 409 from the multiplier 411 is such that it is added to the output signal of the accelerometer 311 in the adding means 409 and the polarity of the output signal of the resolver 405 fed to the adding means 409 is such that it is added to the output signal of the accelerometer 311 in the adding means 409 so that the output signal of the adding means 409 represents $\dot{V}_{CH}$. The output signal of the adding means 409 is integrated by an integrator 413 which produces an output signal representing $V_{CH}$. The output signal of the integrator 413 is fed to the multiplier 403 as is the output signal of the angular rate gyro 317 representing $\dot{\psi}$. The multiplier 403 multiplies these two applied signals together to produce the signal representing $\dot{\psi} V_{CH}$ applied to the adding means 401. The output signal of the integrator 407 is applied to the multiplier 411 as is the output signal of the angular rate gyro 317. The multiplier 411 multiplies the two applied signals together to produce the signal representing $\dot{\psi} V_H$ which is applied to the adding means 409. The output signal of the angular rate gyro 317 representing $\dot{\psi}$ is integrated by the integrator 415 which produces an output signal representing the total change in the heading angle $\psi$. The output signal of the integrator 415 is added to a signal representing $\psi_o$, the initial heading angle at the start of the computing operations in an adding means 417, which accordingly produces an output signal representing the heading angle $\psi$. In the system of FIGS. 5 and 6 the heading angle is the angle between the X coordinate of a set of X and Y coordinates on the earth's surface and the heading axis. The output signal of the adding means 417 is fed to the resolver 405 and to a resolver 419, which also receives the output signals of the integrators 407 and 413 representing the quantities $V_H$ and $V_{CH}$, respectively. In response to the applied signals the resolver 419 produces on an output channel 421 a signal representing $V_H \cos \psi - V_{CH} \sin \psi$ which equals $V_X$, the velocity along the X coordinates. The resolver 419 produces on an output channel 423 a signal representing $V_H \sin \psi + V_{CH} \cos \psi$ which equals $V_Y$, the velocity along the Y coordinates. The output signal on channel 421 representing $V_X$ is integrated by an integrator 425, which produces an output signal representing the distance X traveled from the point of origin along the X coordinates. The signal on channel 423 representing $V_Y$ is integrated by an integrator 427, which produces an output signal representing the distance Y traveled from the point of origin along the Y coordinates. The output signals of the integrators 425 and 427 representing X and Y are fed to the resolver 405. The resolver 405 produces on an output channel 429 a signal proportional to the quantity $X \cos \psi + Y \sin \psi$ and produces on an output channel 431 a signal proportional to $Y \cos \psi - X \sin \psi$. For the small areas over which the system is designed to operate, the quantity $G_H$ is closely approximately proportional to the quantity $$X \cos \psi + Y \sin \psi$$

The resolver 405 applies a scale factor to the output signal produced on channel 429 so that it represents $G_H$. The signal on channel 429 is the signal from the resolver 405 applied to the adding means 401. The quantity $G_{CH}$ is closely approximately proportional to the quantity $$Y \cos \psi - X \sin \psi$$

The output signal of the resolver 405 on channel 431 is provided with an appropriate scale factor to make it represent $G_{CH}$. This output signal on channel 431 is the signal applied to the adding means 409 by the resolver 405. Thus the computer 313 provides the desired navigational data of the distances X and Y traveled from the point of origin of the vehicle where the Z axis was aligned with vertical. If the vehicle is to be maneuvering for more than a short period of time, then correction signals can be added to compensate for the earth's rate of rotation in the same manner as in conventional systems.

It will be appreciated that the above described systems thus provide accurate navigational data with simplified gimbaling and without appreciably increasing the complexity of the computer for converting the sensed inertial signals into useful navigational data. Many modifications may be made to the above described systems without departing from the spirit and scope of the invention, which is defined in the appended claims.

What is claimed is:

1. An inertial system comprising a vehicle, a cluster having a heading axis, a cross heading axis and a Z axis defined therein mutually perpendicular to each other, directional gyro means defining an inertial reference and mounted on said cluster to produce signals representing pivoting of said cluster about said heading and cross heading axes with respect to said inertial reference, gimbal control means mounting said cluster on said vehicle, operative in response to the output signals of said gyro means to maintain said cluster unpivoted about said heading and cross heading axes with respect to said inertial reference, and fixing the angular position of said cluster about said Z axis with respect to said vehicle, a first accelerometer mounted on said cluster to produce an output signal representing the acceleration of said cluster along said heading axis, a second accelerometer mounted on said cluster to produce an output signal representing the acceleration of said cluster along said cross heading axis, an angular rate gyro means mounted on said cluster to produce an output signal to represent the rate of angular rotation of said cluster about said Z axis, means responsive to the output signals of said first and second accelerometers and said angular rate means to Schuler tune the inerital reference defined by said gyro means in order to maintain said Z axis aligned with vertical and including a computer to perform mathematical operations on the output signals of said first and second accelerometers and said angular rate means to provide navigational information.

2. An inertial system comprising a vehicle, a cluster having a heading axis, a cross heading axis and a Z axis defined therein mutually perpendicular to each other, directional gyro means defining and inertial reference and mounted on said cluster to produce signals representing pivoting of said cluster about said heading and cross heading axes with respect to said inertial reference, gimbal control means mounting said cluster on said vehicle, operative in response to the output signals of said gyro means to maintain said cluster unpivoted about said heading and cross heading axes with respect to said inertial reference, and fixing the angular position of said cluster about said Z axis with respect to said vehicle, a first accelerometer mounted on said cluster to produce an output signal representing the acceleration of said cluster along said heading axis, a second accelerometer mounted on said cluster to produce on output signal representing the acceleration of said cluster along said cross heading axis, angular rate gyro means mounted on said cluster to produce an output signal representing the rate of angular rotation of said cluster about said Z axis, and a computer connected to perform mathematical operations on the output signals of said first and second accelerometers and said angular rate means to provide navigational information.

3. An inertial system comprising a cluster having a heading axis, a cross heading axis and a Z axis defined therein mutually perpendicular to each other, directional gyro means stabilizing said cluster only about said heading and cross heading axes, a first accelerometer mounted on said cluster to produce an output signal representing the acceleration of said cluster along said heading axis, a second accelerometer mounted on said cluster to produce an output signal representing the acceleration of said cluster along said cross heading axis, angular rate means mounted on said cluster to measure the angular rate of rotation of said cluster about said Z axis, and means responsive to the output signals of said accelerometers and said angular rate gyro means to maintain the Z axis of said cluster aligned with vertical and including a computer to perform mathematical operations on the output signals of said accelerometers and said angular rate means to provide navigational information.

4. An inertial system comprising a cluster having a heading axis, a cross heading axis and a Z axis defined therein mutually perpendicular to each other, directional gyro means stabilizing said cluster only about said heading and cross heading axes, a first accelerometer mounted on said cluster to produce an output signal representing the acceleration of said cluster along said heading axis, a second accelerometer mounted on said cluster to produce an output signal representing the acceleration of said cluster along said cross heading axis, angular rate gyro means mounted on said cluster to produce an output signal representing the rate of angular rotation of said cluster about said Z axis, a computer connected to perform mathematical operations on the output signals of said first and second accelerometers and said angular rate means to provide navigational information.

5. An inertial system comprising a cluster having a heading axis, a cross-heading axis and a Z axis defined therein mutually perpendicular to one another; directional gyro means stabilizing said cluster about said heading and cross-heading axes only; a first accelerometer mounted on said cluster to produce an output signal representing the acceleration of said cluster along said heading axis; a second accelerometer mounted on said cluster to produce an output signal representing the acceleration of said cluster along said cross-heading axis; angular rate gyro means mounted on said cluster to produce an output signal representing the rate of angular rotation of said cluster about said Z axis; and a computer connected to perform mathematical operations on the output signals of said first and second accelerometers and said angular rate means to provide navigational information, said computer comprising resolving means responsive to the output signals of said first and second accelerometers and said angular rate means to resolve the output signals of said first and second accelerometers through the heading angle between said heading axis and north into a first output signal representing acceleration in the north direction and a second output signal representing acceleration in the east direction, a first adding means to combine an applied input signal with the first output signal of said resolving means, first integrating means to integrate the output signal of said first adding means to provide a signal representing velocity in the north direction $V_N$, second adding means to combine an applied input signal with the second output signal of said resolving means, second integrating means to integrate the output signal of said second adding means to provide an output signal representing velocity in the east direcion $V_E$, and means responsive to the output signals of said first and second integrating means to apply a signal to said first adding means representing $(V_E^2 \tan \lambda)/R$ and to apply to said second adding means a signal representing $(V_E V_N \tan \lambda)/R$ wherein $\lambda$ represents the present latitude and R represents the radius of the earth.

6. An inertial system comprising a cluster having a heading axis, a cross-heading axis and a Z axis defined therein mutually perpendicular to one another; directional gyro means stabilizing said cluster about said heading and cross-heading axes only; a first accelerometer mounted on said cluster to produce an output signal representing the acceleration of said cluster along said heading axis; a second accelerometer mounted on said cluster to produce an output signal representing the acceleration of said cluster along said cross-heading axis; angular rate gyro means mounted on said cluster to produce an output signal representing the rate of angular rotation of said cluster about said Z axis; and a computer connected to perform mathematical operations on the output signals of said first and second accelerometers and said angular rate means to provide navigational information, said computer comprising a first adding means to combine an applied input signal with the output signal of said first accelerometer, means to integrate the output signal of said first adding means to provide a signal representing velocity along the heading axis $V_H$, second adding means to combine an applied input signal with the output signal of said second accelerometer, second integrating means to integrate the output signal of said second adding means to provide a signal representing velocity along said cross-heading axis $V_{CH}$, means responsive to the output signal of said angular rate means and the output signal of said second integrating means to apply a signal representing the product of $V_{CH}$ times the angular rate of rotation of said cluster about said Z axis to said first adding means, and means responsive to the output signals of said angular rate means and said first integrating means to apply a signal representing the product of $V_H$ and the angular rate of rotation of said cluster about said Z axis to the input of said second adding means.

7. An inertial system comprising a cluster having a heading axis, a cross-heading axis and a Z axis defined therein mutually perpendicular to one another; directional gyro means stabilizing said cluster about said heading and cross-heading axes only; a first accelerometer mounted on said cluster to produce an output signal representing the acceleration of said cluster along said heading axis; a second accelerometer mounted on said cluster to produce an output signal representing the acceleration of said cluster along said cross-heading axis; angular rate gyro means mounted on said cluster to produce an output signal representing the rate of angular rotation of said cluster about said Z axis; and a computer connected to perform mathematical operations on the output signals of said first and second accelerometers and said angular rate means to provide navigational information, said computer comprising resolving means responsive to the output signals of said first and second accelerometers and an applied signal representing the heading angle between the heading axis and north to produce a first output signal representing the acceleration in the north direction and a second output signal representing acceleration in the east direction, first adding means to combine an applied input signal with the first output signal of said resolving means, first integrating means to integrate the output signal of said first adding means to provide a signal representing velocity in the north direction $V_N$, second adding means to combine an applied input signal with the second output signal of said resolving means, second integrating means to integrate the output signal of said second adding means to provide a signal representing velocity in the east direction $V_E$, means responsive to the output signals of said first and second integrating means to produce a signal representing $(V_E \tan \lambda)/R$ wherein $\lambda$ represents the present latitude and R represents the radius of the earth, third adding means to combine said output signal representing $(V_E \tan \lambda)/R$ with the output signal of said angular rate means, means to integrate the output signal of said third adding means to provide a signal representing the heading angle, means to apply said signal representing the heading angle to said resolving means, means responsive to the output signal of said second integrating means and said output signal representing $(V_E \tan \lambda)/R$ to apply a signal representing $(V_E^2 \tan \lambda)/R$ to said first adding means, and means responsive to the output signal of said first integrating means and said output signal representing $(V_E \tan \lambda)/R$ to apply a signal to said second adding means representing $(V_E V_N \tan \lambda)/R$.

8. An inertial system comprising a cluster having a heading axis, a cross-heading axis and a Z axis defined therein mutually perpendicular to one another; directional gyro means stabilizing said cluster about said heading and cross-heading axes only; a first accelerometer mounted on said cluster to produce an output signal representing the acceleration of said cluster along said heading axis; a second accelerometer mounted on said cluster to produce an output signal representing the acceleration of said cluster along said cross-heading axis; angular rate gyro means mounted on said cluster to produce an output signal representing the rate of angular rotation of said cluster about said Z axis; and a computer connected to perform mathematical operations on the output signals of said first and second accelerometers and said angular rate means to provide navigational information, said computer comprising a first adding means to add an applied signal to the output signal of said first accelerometer, first integrating means to integrate the output signal of said first adding means to provide a signal representing the velocity along said heading axis $V_H$, second adding means to combine an applied input signal with the output signal of said second accelerometer, second integrating means to integrate the output signal of said second adding means to provide a signal representing velocity along said cross heading axis $V_{CH}$, means responsive to the output of said angular rate means and the output signal of said first integrating means to apply a signal representing the product of $V_H$ times the angular rate of rotation of said cluster about said Z axis to said second adding means, means responsive to the output signal of said second integrating means and said angular rate means to apply a signal representing the product of $V_{CH}$ and the angular rate of rotation of said cluster about said Z axis to said first adding means, third adding means to add an applied input signal to the output signal of said angular rate means, third integrating means to integrate the output signal of said third adding means to provide a signal representing the heading angle between said heading axis and north, means responsive to the output signals of said first, second and third integrating means to apply a signal representing $(V_E \tan \lambda)/R$ to said third adding means wherein $V_E$ represents the velocity in the east direction, $\lambda$ represents the present latitude, and R represents the radius of the earth.

9. An inertial system comprising a cluster having a heading axis, a cross-heading axis and a Z axis defined therein mutually perpendicular to one another; directional gyro means stabilizing said cluster about said heading and cross-heading axes only; a first accelerometer mounted on said cluster to produce an output signal representing the acceleration of said cluster along said heading axis; a second accelerometer mounted on said cluster to produce an output signal representing the acceleration of said cluster along said cross-heading axis; angular rate gyro means mounted on said cluster to produce an output signal representing the rate of angular rotation of said cluster about said Z axis; and a computer connected to perform mathematical operations on the output signals of said first and second accelerometers and said angular rate means to provide navigational information, said computer comprising a first adding means to combine applied input signals with the output signal of said first accelerometer, first integrating means to integrate the output signal of said first adding means to provide a signal representing the velocity along the heading axis $V_H$, second adding means to combine applied input signals with the output signal of said second accelerometer, second integrating means to integrate the output signal of said second adding means to provide a signal representing the velocity along the cross heading axis $V_{CH}$, means responsive to the output signal of said second integrating means and the output signal of said angular rate means to apply a signal representing the product of $V_{CH}$ and the angular rate of rotation of said cluster about said Z axis to said first adding means, means responsive to the output signal of said first integrating means and the output signal of said angular rate means to apply a signal representing $V_H$ times the angular rate of rotation of said cluster about said Z axis to said second adding means, means to integrate the output signal of said angular rate means to provide a signal representing the heading angle between said heading axis and an X coordinate of a set of X and Y coordinates on the earth's surface, and means responsive to the output signals of said first, second and third integrating means to apply a signal representing the component of gravity sensed by said first accelerometer to said first adding means and a signal representing the component of gravity sensed by said second accelerometer to said second adding means.

References Cited by the Examiner

UNITED STATES PATENTS

| | | | |
|---|---|---|---|
| 2,752,792 | 7/1956 | Draper et al. | |
| 2,811,043 | 10/1957 | Bonnell | 73—504 XR |
| 2,895,670 | 7/1959 | Newell. | |
| 2,945,643 | 7/1960 | Slater. | |
| 2,953,303 | 9/1960 | Sedgfield. | |
| 3,023,617 | 3/1962 | Statsinger | 73—504 XR |
| 3,078,042 | 2/1963 | Grado | 235—187 |

OTHER REFERENCES

Slater, "Better Inertial Indicators for Attitude and Heading," Control Engineering, February 1960, pp. 88 to 92.

MALCOLM A. MORRISON, *Primary Examiner.*

C. L. WHITHAM, K. L. DOBYNS,
*Assistant Examiners.*